United States Patent [19]

Benz

[11] 4,121,370
[45] Oct. 24, 1978

[54] HUMANE ANIMAL TRAP
[76] Inventor: Michael Benz, 68, 3rd Ave. South, Williams Lake, British Columbia, Canada, V2G 1H9
[21] Appl. No.: 767,919
[22] Filed: Feb. 11, 1977
[30] Foreign Application Priority Data
Nov. 24, 1976 [CA] Canada ................................ 266471
[51] Int. Cl.$^2$ ............................................ A01M 23/36
[52] U.S. Cl. ............................................ 43/83.5
[58] Field of Search ................... 43/81, 82, 83, 83.5, 43/88, 92, 93, 97, 95

[56] References Cited
U.S. PATENT DOCUMENTS

| | | | |
|---|---|---|---|
| 1,797,923 | 3/1931 | Orr | 43/83 |
| 1,929,286 | 10/1933 | Osborn | 43/82 X |
| 2,169,945 | 8/1939 | Eslick | 43/83 |
| 2,637,931 | 5/1953 | Sklar | 43/83.5 |
| 2,637,932 | 5/1953 | Stilson | 43/83.5 |
| 2,723,486 | 11/1955 | Bouma | 43/83.5 X |
| 3,757,457 | 9/1973 | Mastin | 43/81 |
| 3,896,581 | 7/1975 | Gabry | 43/81 |
| 3,936,973 | 2/1976 | Larocque | 43/81 |

Primary Examiner—Edward M. Coven
Attorney, Agent, or Firm—H. Wayne Rock

[57] ABSTRACT

A humane animal trap has a pair of pivotally connected jaws each having a circular periphery, the jaws being spring-biased to a closed position. The jaws may be automatically set in an open position and to that end one jaw has a pair of rail members extending through the other jaw which members pivotally support a sear member provided with locking means in the form of a notch. The other jaw has a projection thereon extending to between the rail members. As the jaws are moved apart the projection will be brought into registry with the notch and will automatically engage therewith to hold the jaws apart. Bait is secured to a holder attached to the sear member and when an animal attempts to take the bait the notch disengages from the projection allowing the spring to strongly drive the jaws together, trapping the animal. The automatic nature of the setting mechanism means that the trap will be safe for the user as he can devote all his strength to the opening of the trap without having to think about or act separately on the setting or trigger mechanism.

12 Claims, 3 Drawing Figures

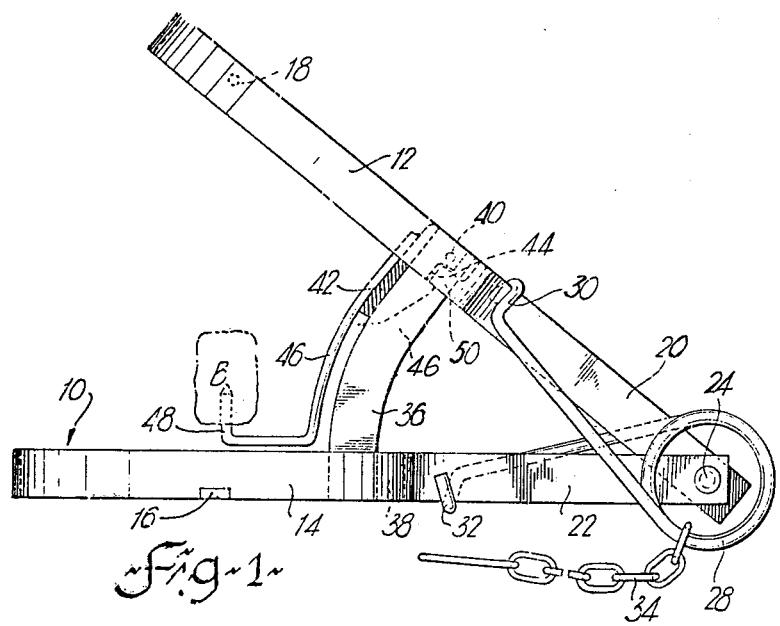
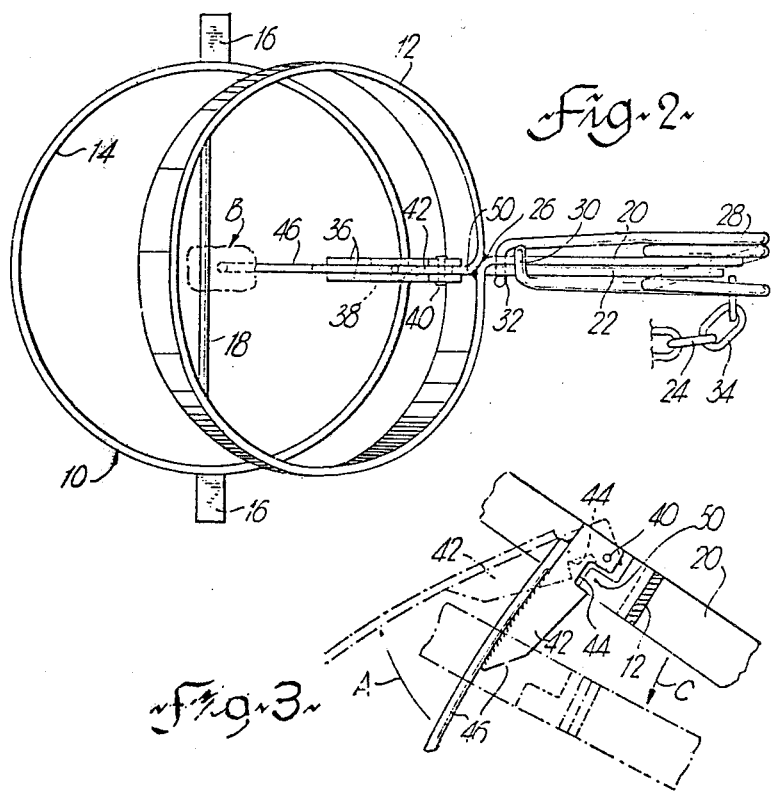

HUMANE ANIMAL TRAP

The present invention relates in general to animal traps and, in particular, to a new humane animal trap especially effective in the trapping of small animals.

BACKGROUND OF THE INVENTION

There have been many attempts in the past to devise humane animal traps; that is, traps which are sufficiently strong to break the back or neck of the trapped animal and thereby greatly reduce the duration of suffering for the animal. Such traps, in the case of fur-bearing animals, are intended as well to reduce the chances of damage to the pelt since the trapped animal will not be capable of fighting the trap and thereby further injuring itself and its coat. Humane animal traps, of necessity, will be very strong since considerable force is required to break the back or neck of the trapped animal and, consequently, the force required to set the trap will also be very great. In most traps known to date it is necessary to set the trigger mechanism by hand and this can leave only one hand free to hold the trap in its open condition while the trigger is set, increasing the chance of an accident should that one hand lose its grip. It accordingly is very desirable to have a humane animal trap which is strong and reliable and at the same time is relatively easy to set, preferably automatically.

SUMMARY OF THE INVENTION

The present invention overcomes the problems of the prior art and fulfills the desirable qualities enumerated above. The trap is strong, having a pair of jaws biased together in the preferred embodiment by a coil spring. The jaws are circular, giving a large zone of effectiveness and, in most instances, movement of the jaws will be in a vertical plane, thereby allowing the trapper to use his feet to hold one jaw on the ground and freeing both hands for setting purposes. In addition, the trap has an automatic trigger mechanism such that when the jaws have been opened by a predetermined amount the trigger will automatically engage and the trap will be set. The bait is fixed to the trigger mechanism so that when an animal grasps the bait the trigger is released to permit the coil spring to drive the jaws together with the desired force to trap and preferably kill the animal therebetween.

Broadly speaking, therefore, the present invention provides a humane animal trap comprising a pair of generally circular jaws, each jaw having an arm extending outwardly from the outer surface thereof; the arms being pivotally connected together whereby one of the jaws may be pivotally moved away from the other of the jaws; spring means positioned about the pivot point of the arms with each end of the spring means being connected to an appropriate one of the arms to bias the jaws to a closed position; at least one rail member extending from the other of the jaws, through the one jaw, in a plane generally parallel to the plane of each of the arms; a sear member pivotally connected to the free end of the rail member, the sear member including locking means therein; engagement means on the one jaw for engaging the locking means automatically upon moving the jaws sufficiently away from the other jaw; and operative means for releasing the engagement means from the locking means to permit the jaws to close under the influence of the spring means.

BRIEF DESCRIPTION OF THE DRAWINGS

FIG. 1 shows an elevation of the trap of the present invention, the trap being in its set condition;

FIG. 2 shows a plan view of the trap shown in FIG. 1, and

FIG. 3 shows an enlarged view of the automatic trigger mechanism.

DESCRIPTION OF THE PREFERRED EMBODIMENT

The trap of the present invention is identified in the drawings by reference number 10. With particular reference to FIGS. 1 and 2, it is seen that the trap includes a pair of jaws 12, 14, each jaw having a generally circular periphery, the diameter of jaw 12 being slightly less than that of jaw 14 so that jaw 12 may fit just inside jaw 14. Jaw 14 is provided with a pair of radially outwardly projecting foot members 16 adjacent the bottom edge, while jaw 12 has a bar 18 extending along a chord thereof and positioned as shown in FIG. 2. Bar 18 and foot members 16 are used as aids in the setting of the trap as will be described hereinafter.

Each jaw is provided with a pivot arm extending radially therefrom, a first arm 20 being connected to jaw 12 and a second arm 22 being connected to jaw 14. The arms are pivotally joined as by pivot pin 24 adjacent the free end of the arms whereby jaw 12 is movable away from jaw 14 as illustrated in FIG. 1. Each arm may be formed from a separate length of bar stock welded to the outside surface of the appropriate jaw or, as seen in FIG. 2, the arm may be formed from the same length that forms the jaw, the free end of the jaw being welded to the bend between jaw and arm as at 26 for jaw 12.

A coil spring 28 is coiled generally about the pivot point or axis of the arms as established by pin 24. One end of the spring is connected to arm 20 as by a formed hook 30 and the other end of the spring is connected to arm 22 as by a formed hook 32. The spring forces are such as to strongly bias the jaw 12 to a closed position with respect to jaw 14. A chain 34 may be connected to one coil of the spring for attachment of the trap to some fixture, such as a tree, in order to prevent excessive movement of the trap away from its rest position.

The automatic trigger mechanism will now be described with particular reference to FIGS. 1 and 3. In FIG. 1 it is seen that a pair of parallel, spaced apart rails 36 are affixed to a radially inwardly extending portion 38 of the free end of jaws 14, a rail being welded to each side of the extending portion. The rails project outwardly of jaw 14, generally perpendicular to the plane of the jaw and through jaw 12. Each rail 36 is arcuate in form, taking its center from pivot pin 24. Each rail lies in a plane parallel to that of the arm 22.

At the free end of the rails 36, a pivot pin 40 extends therebetween and pivotally supports a sear member 42, the sear member being provided with locking means in the form of a notch 44 in the edge which normally faces the arms 20, 22. The sear member also has a sloping surface 46 which leads from the lower extremity of the sear member outwardly to the notch 44. Also attached to the sear member on the edge opposite notch 44 is a bait holder 46 in the form of a J-shaped rod which follows the contour of rails 36 and terminates in a portion 48 to which a bait B may be attached. For carnivorous animals, portion 48 may be a spike, as shown, whereby bait B may be a small piece of meat, or, for vegetarian animals, portion 48 may be a pan to carry an appropriate bait (not shown). The bait holder 46 acts as an operative means to release the trigger mechanism.

The final component of the trigger mechanism is an engagement means in the form of a projection 50 on the inner surface of jaw 12, projection 50 extending into the zone between rails 36 and being adapted to engage the locking means, notch 44. The projection 50 may be formed on a portion of the free end of jaw 12 which is bent into the interior of jaw 12 or it may be a separate piece welded to the inside surface of jaw 12.

OPERATION

The operation of the preferred embodiment will now be described, it being assumed that the jaws are initially closed, not shown. To open the jaws, and to set the trap, the user first of all places the trap on the ground with jaw 14 lowermost. His feet are then placed on foot members 16 to hold jaw 14 against the ground and he grasps bar 18 in jaw 12 with one or both hands. Upward movement of the hands will raise jaw 12 relative to jaw 14 and during this raising motion projection 50 will also raise between rails 36 until it engages the sloping surface 46 on sear member 42. Continued upward movement of jaw 12 will cause a camming motion whereby sear member 42 (and bait holder 46) will be pivotally displaced in the direction of arrow A (FIG. 3) until such time as the projection 50 encounters the notch 44 at which time the sear member 42 will fall back towards rails 36 bringing notch 44 into registry with projection 50. The biasing force of spring 28 will, once the raising movement has halted, tend to close the jaws, but closure will be prevented due to the positive engagement between projection 50 and notch 44. With the present invention, therefore, there is no need for the trapper to use a hand to physically set the trigger mechanism while the other hand holds the trap open. In the present invention the trigger mechanism is set automatically during the opening operation.

When the trap has been set it is left in a desirable location, appropriately baited, the bait having been positioned before the trap was set. When an animal attempts to take the bait it will deflect the bait holder again in the direction of arrow A (FIG. 3), the holder acting as a lever arm to pivot the sear member and to release the engagement of projection 50 with notch 44 and permitting spring 28 to drive jaw 12 downwardly in the direction of arrow C (FIG. 3) to trap the animal between the jaws 12 and 14.

In summary, therefore, it is seen that the present invention provides a trap that is humane and that is safe for the trapper to set since the setting operation is automatic. The trap is also economical in that it is not complicated and hence would be inexpensive to manufacture.

It is also understood that the trap of the present invention is susceptible to modification by someone skilled in the art. For example, a different spring arrangement, other than a coil spring could be used. Also, the jaws could be brought close together in the closed position by tilting arm 22 upwardly relative to jaw 14 and/or by tilting arm 20 downwardly relative to jaw 12. The sear member 42 may be separate from the bait holder 46 as shown or it may be formed from a single piece of material appropriately shaped. The rails could be configured so that only one rail is required. Other modifications are possible and hence the scope of protection afforded the present invention should be determined only from the appended claims.

The embodiments of the invention in which an exclusive property or privilege is claimed are defined as follows:

1. A humane animal trap comprising:
   (a) a pair of generally circular jaws, each jaw having an arm extending outwardly from the outer surface thereof;
   (b) said arms being pivotally connected together whereby one of said jaws may be pivotally moved away from the other of said jaws;
   (c) spring means positioned about the pivot point of said arms with each end of said spring means being connected to an appropriate one of said arms to bias said jaws to a closed position;
   (d) at least one rail member connected at one end to the other jaw and extending through the one jaw, in a plane generally parallel to each said arms;
   (e) a sear member pivotally connected to the other end of said rail member, said sear member including locking means therein;
   (f) engagement means on said one jaw for engaging said locking means automatically upon moving said one jaw sufficiently away from said other jaw; and
   (g) operative means connected to said sear member whereby movement thereof away from said rail member releases said engagement means from said locking means to permit said jaws to close under the influence of said spring means.

2. The trap of claim 1 and including a pair of parallel spaced apart rail members, said sear member being pivotally located between said rail members.

3. The trap of claim 2 wherein said locking means includes a notch formed in an edge of said sear member and a sloping camming surface in said edge leading from a lower extremity of said sear member to said notch.

4. The trap of claim 3 wherein said engagement means includes a projection extending from the inner surface of said one jaw to between said rail members, said projection being engageable with said camming surface to pivotally displace said sear member during movement of said one jaw away from said other jaw until said notch comes into registry with said projection.

5. The trap of claim 1 wherein said operative means includes a bait holder extending from said sear member as a lever arm therefor, said holder also being adapted to carry bait for said trap.

6. The trap of claim 1 and including a bar extending along a chord of said one jaw and serving as a handhold when opening the jaws.

7. The trap of claim 1 and including foot members extending outwardly from said other jaw and serving as means for holding said other jaw when opening said jaws.

8. A humane animal trap comprising:
   (a) a pair of jaws, each jaw having a generally circular periphery, the diameter of one jaw being less than the diameter of the other jaw;
   (b) a first pivot arm connected to said one jaw, and a second pivot arm, connected to said other jaw, said arms being pivotally joined whereby said one jaw will fit generally within the periphery of said other jaw and said one jaw is movable away from said other jaw;
   (c) a coil spring coiled generally about the pivot point of said arms, one end of said spring being connected to said first arm, the other end of said spring being connected to said second arm, whereby said spring biases said one jaw strongly towards said other jaw;

(d) a pair of parallel, spaced apart rails each connected at one end to said other jaw and extending in a plane generally perpendicular to the plane of said other jaw, through said one jaw and generally parallel to said second arm, said rails being arcuate in plan and having a center of curvature coincident with said pivot point;

(e) a pivot pin extending between said rails adjacent the ends thereof removed from said other jaw, said pin pivotally supporting a sear member and a bait holder connected thereto, said sear member having a notch in the edge normally facing said arms; and (f) a projection on the inner surface of said one jaw, extending between said rails and engageable with said notch;

whereby to set the trap the jaws are opened until said projection automatically engages said notch to hold the jaws apart, movement of said bait holder away from said rails disengaging said notch from said projection thereby permitting rapid closure of said one jaw towards said other jaw under the influence of said coil spring.

9. The trap of claim 8 wherein said sear member includes a sloping camming surface along said edge extending from a lower extremity of said sear member to said notch, said projection being engageable with said surface to pivotally displace said sear member until said projection comes into registry with said notch.

10. The trap of claim 8 and including a bar extending along a chord of said one jaw and serving as a handhold when opening the jaws.

11. The trap of claim 8, and including foot members projecting outwardly from said other jaw serving as means for holding said other jaw when opening said jaws.

12. The trap of claim 8 wherein said bait holder comprises a rod formed generally into a J-shape, the straight portion thereof being attached to said sear member and the curved portion being positioned, in the operative condition, adjacent said other jaw and being adapted to have bait secured thereto.

* * * * *